(12) United States Patent
Tateno

(10) Patent No.: US 8,033,098 B2
(45) Date of Patent: Oct. 11, 2011

(54) CONTROL APPARATUS AND CONTROL METHOD FOR INTERNAL COMBUSTION ENGINE

(75) Inventor: Manabu Tateno, Sunto-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 709 days.

(21) Appl. No.: 12/066,292

(22) PCT Filed: Aug. 16, 2006

(86) PCT No.: PCT/IB2006/002224
§ 371 (c)(1),
(2), (4) Date: Mar. 10, 2008

(87) PCT Pub. No.: WO2007/031822
PCT Pub. Date: Mar. 22, 2007

(65) Prior Publication Data
US 2008/0210208 A1 Sep. 4, 2008

(30) Foreign Application Priority Data
Sep. 12, 2005 (JP) .................................. 2005-263615

(51) Int. Cl.
*F01N 3/00* (2006.01)
(52) U.S. Cl. ................ 60/285; 60/274; 60/277; 60/284; 123/90.11; 123/90.15; 123/90.19
(58) Field of Classification Search .................. 60/274, 60/277, 284, 285, 286; 123/90.11, 90.15, 123/90.19
See application file for complete search history.

(56) References Cited

U.S. PATENT DOCUMENTS

| | | | |
|---|---|---|---|
| 5,233,831 A * | 8/1993 | Hitomi et al. | 60/284 |
| 6,360,531 B1 | 3/2002 | Wiemero et al. | |
| 6,526,745 B1 * | 3/2003 | Ogiso | 60/285 |
| 6,691,506 B2 * | 2/2004 | Shimizu | 60/284 |
| 6,772,585 B2 * | 8/2004 | Iihoshi et al. | 60/277 |
| 7,191,589 B2 * | 3/2007 | Yasui et al. | 60/284 |
| 7,447,586 B2 * | 11/2008 | Idogawa et al. | 701/105 |

FOREIGN PATENT DOCUMENTS

| | | |
|---|---|---|
| DE | 199 26 138 | 12/2000 |
| EP | 1 063 393 | 12/2000 |
| EP | 1 431 557 | 6/2004 |
| JP | 5 59936 | 3/1993 |
| JP | 6-117303 | 4/1994 |
| JP | 6 213056 | 8/1994 |
| JP | 11 210507 | 8/1999 |
| JP | 2002-227672 A | 8/2002 |
| JP | 2003-172189 A | 6/2003 |
| JP | 2005 23864 | 1/2005 |

* cited by examiner

*Primary Examiner* — Binh Q Tran
(74) *Attorney, Agent, or Firm* — Oblon, Spivak, McClelland, Maier & Neustadt, L.L.P.

(57) ABSTRACT

A throttle operation is performed after an internal combustion engine is started. Then, temperature of a catalyst is obtained based on a signal output from a temperature sensor fitted to the catalyst. It is then determined whether the temperature obtained is equal to or higher than the activation temperature. If it is determined that the temperature of the catalyst has not reached the activation temperature, the throttle operation continues. On the other hand, if it is determined that the temperature of the catalyst is equal to or higher than the activation temperature, the non-throttle operation is performed instead of the throttle operation.

12 Claims, 5 Drawing Sheets

CONTROL APPARATUS AND CONTROL METHOD FOR INTERNAL COMBUSTION ENGINE

BACKGROUND OF THE INVENTION

1. Field of the Invention

The invention relates generally to a control apparatus and control method for an internal combustion engine. More specifically, the invention relates to a control apparatus and control method that controls an internal combustion engine where the operation for controlling the amount of air taken in a cylinder is switched between a throttle operation and a non-throttle operation.

2. Description of the Related Art

An exhaust gas control catalyst for an internal combustion engine cannot satisfactorily purify exhaust gas, if the temperature thereof is below a predetermined activation temperature. Accordingly, if an internal combustion engine is started while it is cold, the temperature of the catalyst needs to be increased to the activation temperature as quickly as possible.

Japanese Patent Application Publication No. JP-A-06-213056 describes a system that performs a catalyst warming control to retard the ignition timing, which increases the temperature of the exhaust gas, after an internal combustion engine is started. The system stops the catalyst warming control, if it is determined, during the catalyst warming control, that a vehicle will start running. Thus, rough operational feeling that a driver may feel as the vehicle starts running is prevented.

In a spark ignition internal combustion engine, the amount of air taken in a cylinder is usually controlled by regulating the opening amount of a throttle valve. However, in recent years, internal combustion engines with variable valve systems that change the valve-open duration and the valve lift amount of intake valves have been proposed. In such internal combustion engines, the amount of air taken in a cylinder is controlled mainly by operating the variable valve system, so-called non-throttle operation. Controlling the amount of air taken in the cylinder by the non-throttle operation reduces pumping loss considerably, and significantly improves fuel efficiency.

However, because the pumping loss is small and the engine load is low during the non-throttle operation, the amount of exhaust gas is also small. Accordingly, it takes a long time to increase the temperature of the catalyst to the activation temperature. As a result, the amount of exhaust emissions is likely to increase.

SUMMARY OF THE INVENTION

The invention provides a control apparatus and control method for an internal combustion engine which improves fuel efficiency and reduces exhaust emissions.

A first aspect of the invention relates to a control apparatus for an internal combustion engine, including a throttle valve provided in an intake passage of the internal combustion engine; a throttle operation portion that performs a throttle operation for controlling the amount of air taken in a cylinder by regulating the opening amount of the throttle valve; and a catalyst provided in an exhaust passage of the internal combustion engine. The control apparatus according to the first aspect further includes a variable valve system that changes at least one of the valve-open duration and the valve lift amount of an intake valve of the internal combustion engine; a non-throttle operation portion that performs a non-throttle operation for controlling the amount of air taken in the cylinder by operating the variable valve system; a temperature detection portion that detects or estimates the temperature of the catalyst; and a switching time determination portion that prohibits the non-throttle operation when the temperature of the catalyst is below a predetermined value, and that permits the non-throttle operation when the temperature of the catalyst is equal to or higher than the predetermined value.

A second aspect of the invention relates to a control apparatus for an internal combustion engine, including a throttle valve provided in an intake passage of the internal combustion engine; a throttle operation portion that performs a throttle operation for controlling the amount of air taken in a cylinder by regulating the opening amount of the throttle valve; and a catalyst provided in an exhaust passage of the internal combustion engine. The control apparatus according to the second aspect further includes a variable valve system that changes at least one of the valve-open duration and the valve lift amount of an intake valve of the internal combustion engine; a non-throttle operation portion that performs a non-throttle operation for controlling the amount of air taken in the cylinder by operating the variable valve system; a first catalyst warming portion that performs a first catalyst warming control during the throttle operation, when the catalyst needs to be warmed; and a switching portion that switches the operation for controlling the amount of air taken in the cylinder from the throttle operation to the non-throttle operation, when the first catalyst warming control ends.

A third aspect of the invention relates to the control apparatus for an internal combustion engine according to the second aspect. The control apparatus according to the third aspect further includes a vehicle-running-start determination portion that determines whether a vehicle including the internal combustion engine has started running or will start running; a stop portion that stops the first catalyst warming control, if it is determined, during the first catalyst warming control, that the vehicle has started running or will start running; and a second catalyst warming portion that switches, when the first catalyst warming control is stopped, the operation for controlling the amount of air taken in the cylinder from the throttle operation to the non-throttle operation, and that performs a second catalyst warming control that is different from the first catalyst warming control.

A fourth aspect of the invention relates to a control method for an internal combustion engine where at least a throttle operation, in which the amount of air taken in a cylinder is controlled by regulating the opening amount of a throttle valve provided in an intake passage of the internal combustion engine, is performed. In the control method according to the fourth aspect, initially, the temperature of a catalyst provided in an exhaust passage of the internal combustion engine is detected or estimated. If the temperature of the catalyst is below a predetermined value, a non-throttle operation, in which the amount of air taken in the cylinder is controlled by regulating at least one of the valve-open duration and the valve lift amount of an intake valve of the internal combustion engine, is prohibited. If the temperature of the catalyst is equal to or higher than the predetermined value, the non-throttle operation is permitted.

A fifth aspect of the invention relates to a control method for an internal combustion engine where at least a throttle operation, in which the amount of air taken in a cylinder is controlled by regulating the opening amount of a throttle valve provided in an intake passage of the internal combustion engine, is performed. In the control method according to the fifth aspect, when a catalyst provided in an exhaust passage of the internal combustion engine needs to be warmed, a first catalyst warming control is performed during the throttle operation. When the first catalyst warming control ends, the operation for controlling the amount of air taken in the cylinder is switched from the throttle operation to a non-throttle operation for controlling the amount of air taken in the cylinder by regulating at least one of the valve-open duration and the valve lift amount of an intake valve of the internal combustion engine.

A sixth aspect of the invention relates to the control method for an internal combustion engine according to the fifth aspect. The control method according to the sixth aspect, it is determined whether a vehicle including the internal combustion engine has started running or will start running. If it is determined, during the first catalyst warming control, that the vehicle has started running or will start running, the first catalyst warming control is stopped. When the first catalyst warming control is stopped, the operation for controlling the amount of air taken in the cylinder is switched from the throttle operation to the non-throttle operation, and a second catalyst warming control that is different from the first catalyst warming control is performed.

A seventh aspect of the invention relates to a control apparatus for an internal combustion engine, including a throttle valve provided in an intake passage of the internal combustion engine; a variable valve system that changes at least one of the valve-open duration and the valve lift amount of an intake valve of the internal combustion engine; a throttle operation portion that performs a throttle operation for controlling the amount of air taken in a cylinder by regulating the opening amount of the throttle valve; a non-throttle operation portion that performs a non-throttle operation for controlling the amount of air taken in the cylinder by operating the variable valve system; a catalyst provided in an exhaust passage of the internal combustion engine; a temperature detection portion that detects or estimates the temperature of the catalyst; and a switching time determination portion that prohibits the non-throttle operation when the temperature of the catalyst is below a predetermined value, and that permits the non-throttle operation when the temperature of the catalyst is equal to or higher than the predetermined value.

An eighth aspect of the invention relates to a control apparatus for an internal combustion engine, including a throttle valve provided in an intake passage of the internal combustion engine; a variable valve system that changes at least one of the valve-open duration and the valve lift amount of an intake valve of the internal combustion engine; a throttle operation portion that performs a throttle operation for controlling the amount of air taken in a cylinder by regulating the opening amount of the throttle valve; a non-throttle operation portion that performs a non-throttle operation for controlling the amount of air taken in the cylinder by operating the variable valve system; a catalyst provided in an exhaust passage of the internal combustion engine; a first catalyst warming portion that performs a first catalyst warming control during the throttle operation, when the catalyst needs to be warmed; and a switching portion that switches the operation for controlling the amount of air taken in the cylinder from the throttle operation to the non-throttle operation, when the first catalyst warming control ends.

According to each of the first, fourth, and seventh aspects of the invention, when the temperature of the catalyst is below the predetermined value, the non-throttle operation is prohibited and the throttle operation is performed. When the temperature of the catalyst is equal to or higher than the predetermined value, the non-throttle operation is permitted. The amount of heat energy supplied from the exhaust gas to the catalyst during the throttle operation is greater than that during the non-throttle operation. According to each of the first, fourth, and seventh aspects of the invention, because the throttle operation is performed while the catalyst is warmed up, the catalyst can be quickly warmed, which reduces exhaust emissions. Also, after the catalyst is sufficiently warmed, the operation for controlling the amount of air taken in the cylinder is immediately switched to the highly efficient non-throttle operation. Accordingly, the fuel efficiency improves.

According to each of the second, fifth, and seventh aspects of the invention, the throttle operation is performed during the catalyst warming control. When the catalyst warming control ends, the operation for controlling the amount of air taken in the cylinder is switched to the non-throttle operation. The amount of heat energy supplied from the exhaust gas to the catalyst during the throttle operation is greater than that during the non-throttle operation. According to each of the second, fifth, and seventh aspects of the invention, because the throttle operation is performed during the catalyst warming control, the efficiency of the catalyst warming control is not reduced. Therefore, the catalyst can be warmed quickly, which reduces the exhaust emissions. Also, after the catalyst warming control ends, the operation for controlling the amount of air taken in the cylinder is immediately switched to the highly efficient non-throttle operation. Accordingly, the fuel efficiency improves.

According to each of the third and sixth aspects of the invention, if it is determined, during the catalyst warming control, that the vehicle has started running or will start running, the catalyst warming control is stopped. Because inconveniences such as torque fluctuation due to the catalyst warming control can be avoided when the vehicle starts running, the vehicle can start running smoothly.

According to each of the third and sixth aspects of the invention, when the catalyst warming control is stopped, the second catalyst warming control, which is different from the first catalyst control, is performed. Accordingly, a delay in activation of the catalyst can be prevented, which reduces the exhaust emissions.

DETAILED DESCRIPTION OF THE EXAMPLE EMBODIMENTS

Figure 1:
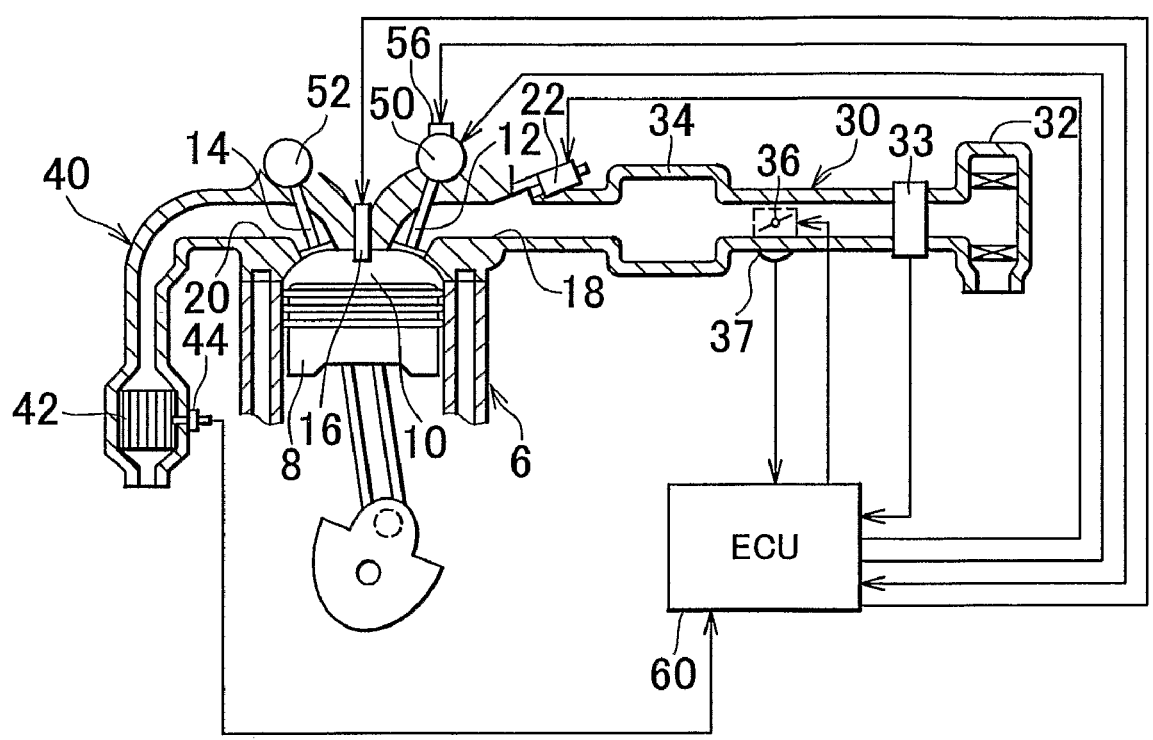
FIG. 1 illustrates the view for describing the structure of a system in a first embodiment of the invention.

First, the structure of a system in the invention will be described with reference to FIG. 1. FIG. 1 shows the structure of the system in a first embodiment of the invention. As shown in FIG. 1, the system includes an internal combustion engine 6. The internal combustion engine 6 is a multi-cylinder engine. FIG. 1 shows the cross section of one of the multiple cylinders. Each cylinder of the internal combustion engine 6 is provided with a piston 8, a combustion chamber 10, an intake valve 12, an exhaust valve 14, a spark plug 16, and an intake port 18 and an exhaust port 20. The intake port 18 and the exhaust port 20 are connected to the inside of the cylinder. The intake valve 12 opens/closes to permit/interrupt gas flow between the intake port 18 and the combustion chamber 10. The exhaust valve 14 opens/closes to permit/interrupt gas flow between the combustion chamber 10 and the exhaust port 20.

In addition, each cylinder of the internal combustion engine 6 is provided with a fuel injection valve 22 that injects fuel into the intake port 18. The invention can be applied not only to port-injection internal combustion engines but also to direct-injection internal combustion engines where fuel is directly injected into a cylinder.

The intake port 18 is connected to an intake passage 30. An air-cleaner 32 is provided at the upstream-side-end of the intake passage 30. An air-flow meter 33, which detects the amount of intake air flowing through the intake passage 30, is provided downstream of the air-cleaner 32. The downstream portion of the intake passage 30 branches off into portions corresponding to the respective cylinders (intake ports 18). A surge tank 34 is provided at the branch portion where the intake passage 30 branches off into these portions.

A throttle valve 36 is provided upstream of the surge tank 34 arranged in the intake passage 30. The throttle valve 36 is an electronically-controlled throttle valve that is opened and closed by a motor. The throttle valve 36 is provided with a throttle position sensor 37 that detects the opening amount of the throttle valve 36.

An exhaust passage 40 is connected to the exhaust port 20. A catalyst 42, which purifies exhaust gas, is provided in the exhaust passage 40. The catalyst 42 is provided with a temperature sensor 44, which detects the temperature of the catalyst 42.

The intake valve 12 is provided with a variable valve timing mechanism (hereinafter, referred to as a "VVT mechanism") 50 that changes the valve timing of the intake valve 12. The VVT mechanism 50 changes the phase of the valve open period of the intake valve 12 by changing the rotational position of an intake camshaft with respect to a timing gear. The VVT mechanism 50 is driven by hydraulic pressure. However the VVT mechanism 50 is beyond the scope of the invention. Thus, a detailed description thereof will not be provided.

The exhaust valve 14 is provided with a VVT mechanism 52 that has the same configuration as the VVT mechanism 50. The VVT mechanism 52 changes the phase of the valve open period of the exhaust valve 14.

The intake valve 12 is provided with a variable valve system 56 that changes the valve-open duration and the valve lift amount of the intake valve 12. The structure of the variable valve system 56 will be described later in detail.

The system according to the first embodiment includes an ECU (Electronic Control Unit) 60. The ECU 60 is connected to various sensors such as the throttle position sensor 37 and the temperature sensor 44. The ECU 60 is also connected to various actuators such as actuators for the spark plug 16, the fuel injection valve 22, the VVT mechanisms 50, 52 and the variable valve system 56. The ECU 60 controls the operational state of the internal combustion engine 6 by appropriately driving the actuators based on the outputs from the sensors.

Figure 2:
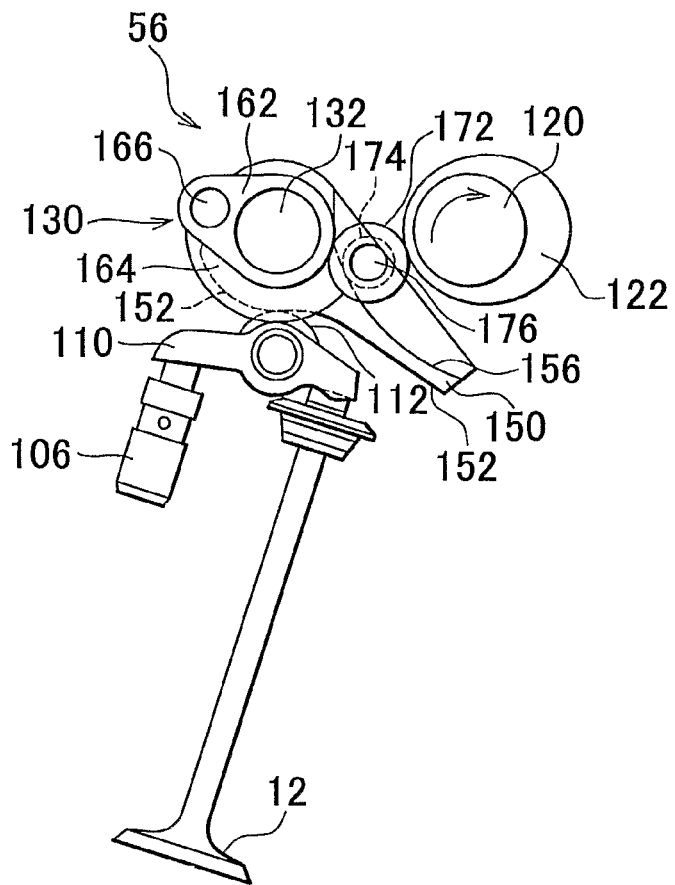
FIG. 2 illustrates the side view of a variable valve system in the first embodiment of the invention.

FIG. 2 illustrates the side view of the variable valve system 56. As shown in FIG. 2, the variable valve system 56 is provided between a drive cam 122 provided onto an intake camshaft 120 and the intake valve 12. The variable valve system 56 has a control shaft 132 that is parallel to the intake camshaft 120. A rotary drive mechanism (not shown) that includes a worm wheel, a worm gear, and a motor is provided at one end of the control shaft 132. With the rotary drive mechanism, the rotational position of the control shaft 132 can be appropriately controlled.

A control arm 162, which protrudes in the radial direction of the control shaft 132, is fixed to the control shaft 132. A link arm 164 is coupled with the control arm 162 so as to be pivotable about a pin 166. A first roller 172 and a second roller 174 are arranged at the end of the link arm 164 so as to be rotatable around a connecting shaft 176.

A pivot cam arm 150 is supported so as to be pivotable about the control shaft 132. A rocker arm 110 is provided below the pivot cam arm 150. One end of the rocker arm 110 is supported by a hydraulic lash adjuster 106, and the other end of the rocker arm 110 contacts the end of the valve shaft of the intake valve 12. A rocker roller 112 is rotatably fitted to the middle portion of the rocker arm 110.

When the cam nose of the drive cam 122 presses the first roller 172, the second roller 174 presses a slide surface 156 of the pivot cam arm 150, whereby the pivot cam arm 150 moves downward, as shown in FIG. 2. Thus, a pivot cam surface 152 of the pivot cam arm 150 presses the rocker roller 112. Then, the rocker arm 110 is moved to lift the intake valve 12, namely, to open the intake valve 12.

FIG. 2 shows the state of the variable valve system 56, in which the valve-open duration and the valve lift amount of the intake valve 12 are maximum values. Rotating the control shaft 132 in the counterclockwise direction starting from the position shown in FIG. 2 reduces the valve-open duration and the valve lift amount of the intake valve 12. The rotation of the control shaft 132 in the counterclockwise direction in FIG. 2 moves the first roller 172 and the second roller 174 toward the end of the pivot cam arm 150, which reduces the amount the pivot cam arm 150 can pivot. As a result, the valve-open duration and the valve lift amount of the intake valve 12 are reduced.

Figure 3:
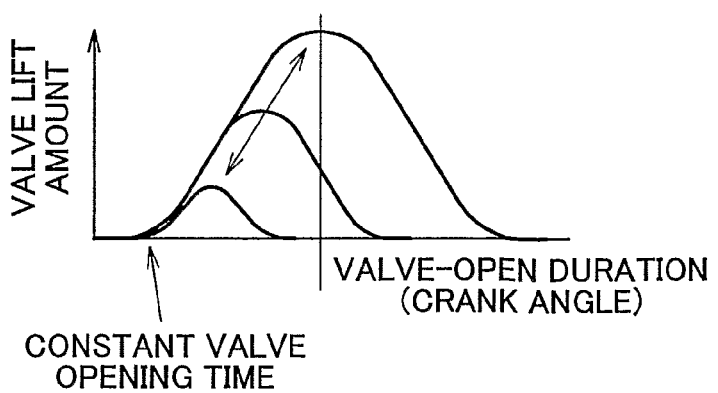
FIG. 3 illustrates the graph showing the lift diagram when the valve-open duration and the valve lift amount of an intake valve are changed by the variable valve system.

FIG. 3 illustrates the graph showing the lift diagram when the valve-open duration and the valve lift amount of the intake valve 12 are changed by the variable valve system 56. As shown in FIG. 3, the variable valve system 56 changes the valve-open duration and the valve lift amount while keeping the opening time of the intake valve 12 constant.

Next, the outline of the operation according to the first embodiment will be described.

In the internal combustion engine 6 of the system described above, the operation for controlling the amount of air taken in the cylinder can be selectively switched between the throttle operation and the non-throttle operation. In a commonly used spark ignition internal combustion engine, the throttle operation is usually performed to control the amount of air taken in the cylinder. During the throttle operation, the amount of air taken in the cylinder is regulated by controlling the opening amount of the throttle valve 36 with valve-open duration and valve lift amount of the intake valve 12 maintained constant.

Meanwhile, during the non-throttle operation, the throttle valve 36 is kept fully open. The amount of air taken in the cylinder is regulated by changing the valve-open duration and the valve lift amount of the intake valve 12 by operating the variable valve system 56. The non-throttle operation does not cause a loss due to reduction in the opening amount of the throttle valve 36. Accordingly, the pumping loss can be significantly reduced, improving efficiency. Namely, performing the non-throttle operation significantly improves the fuel efficiency.

Particularly, with the variable valve system 56 according to first embodiment, the valve-open duration (more accurately, the valve closing time) and the valve lift amount are changed with the operating time of the intake valve 12 maintained constant. Therefore, the operation, which may cause significant small pumping loss, can be performed without using the VVT mechanism 50.

When the non-throttle operation is performed, the amount of fuel to be burned is reduced by the amount corresponding to the increase in efficiency. Accordingly, the amount of exhaust gas is reduced, and the heat energy supplied from the exhaust gas to the catalyst 42 is also reduced. Therefore, if the non-throttle operation is performed when the catalyst 42 needs to be warmed, the time required to warm the catalyst 42 increases in comparison to when the throttle operation is performed. As the time required to warm the catalyst 42 increase, the amount of exhaust gas discharged before the catalyst 42 is enabled to satisfactorily purify the exhaust gas increase, resulting in an increase in the exhaust emissions.

According to the first embodiment, the non-throttle operation is prohibited and the throttle operation is performed during the period after the internal combustion engine 6 is started until the temperature of the catalyst 42 is increased to the activation temperature in order to prevent such an increase in the exhaust emissions. In the first embodiment, the activation temperature of the catalyst 42 is, for example, 200° C.

Figure 4:
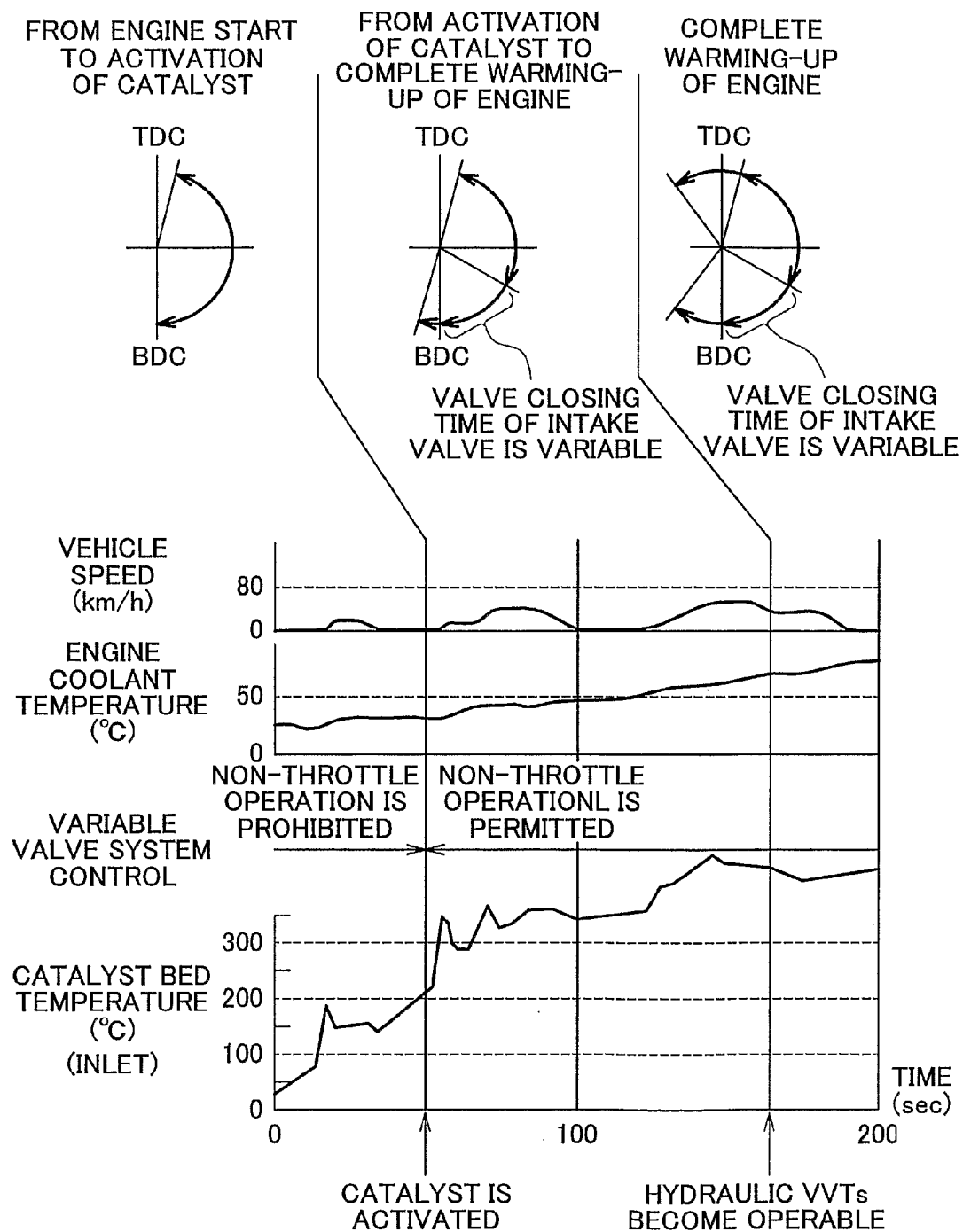
FIG. 4 illustrates the graph for describing the contents of the control of the variable valve system and a VVT (variable valve timing) mechanism in the first embodiment of the invention.

FIG. 4 illustrates the view for describing the contents of the control of the variable valve system 56 and the VVT mechanism 50 in the first embodiment. The graphs indicated on the lower side of FIG. 4 shows changes in the vehicle speed, the engine coolant temperature, and the temperature of the catalyst 42 (referred to as the "catalyst bed temperature" in FIG. 4) when the vehicle including the internal combustion engine 6 runs in the predetermined running mode after the internal combustion engine 6 is started.

In the example shown in FIG. 4, the temperature of the catalyst 42 reaches the activation temperature when approximately 50 seconds have elapsed since the internal combustion engine 6 is started. Meanwhile, the engine coolant temperature, which is achieved when approximately 50 seconds have elapsed since the internal combustion engine 6 is started, shows that the internal combustion engine 6 has not been sufficiently warmed yet. It is difficult to operate the VVT mechanisms 50, 52, which are driven by hydraulic pressure, when the temperature of the internal combustion engine 6 is low because the viscosity of lubricating oil is low. In the example shown in FIG. 4, it takes approximately 170 seconds after the internal combustion engine 6 is started to sufficiently warm the internal combustion engine 6 to bring the VVT mechanisms 50, 52 into the operable condition.

As described above, with the variable valve system 56, the VVT mechanism 50 need not be operated when the non-throttle operation is performed. Namely, according to the first embodiment, the non-throttle operation can be performed without any problem even when the internal combustion engine 6 has not been sufficiently warmed. In the first embodiment, therefore, the operation for controlling the amount of air taken in the cylinder is switched from the throttle operation to the non-throttle operation when the temperature of the catalyst 42 reaches the activation temperature. With such switching operation, the fuel efficiency can be improved as much as possible within the bounds of not disturbing prompt activation of the catalyst 42.

Figure 5:
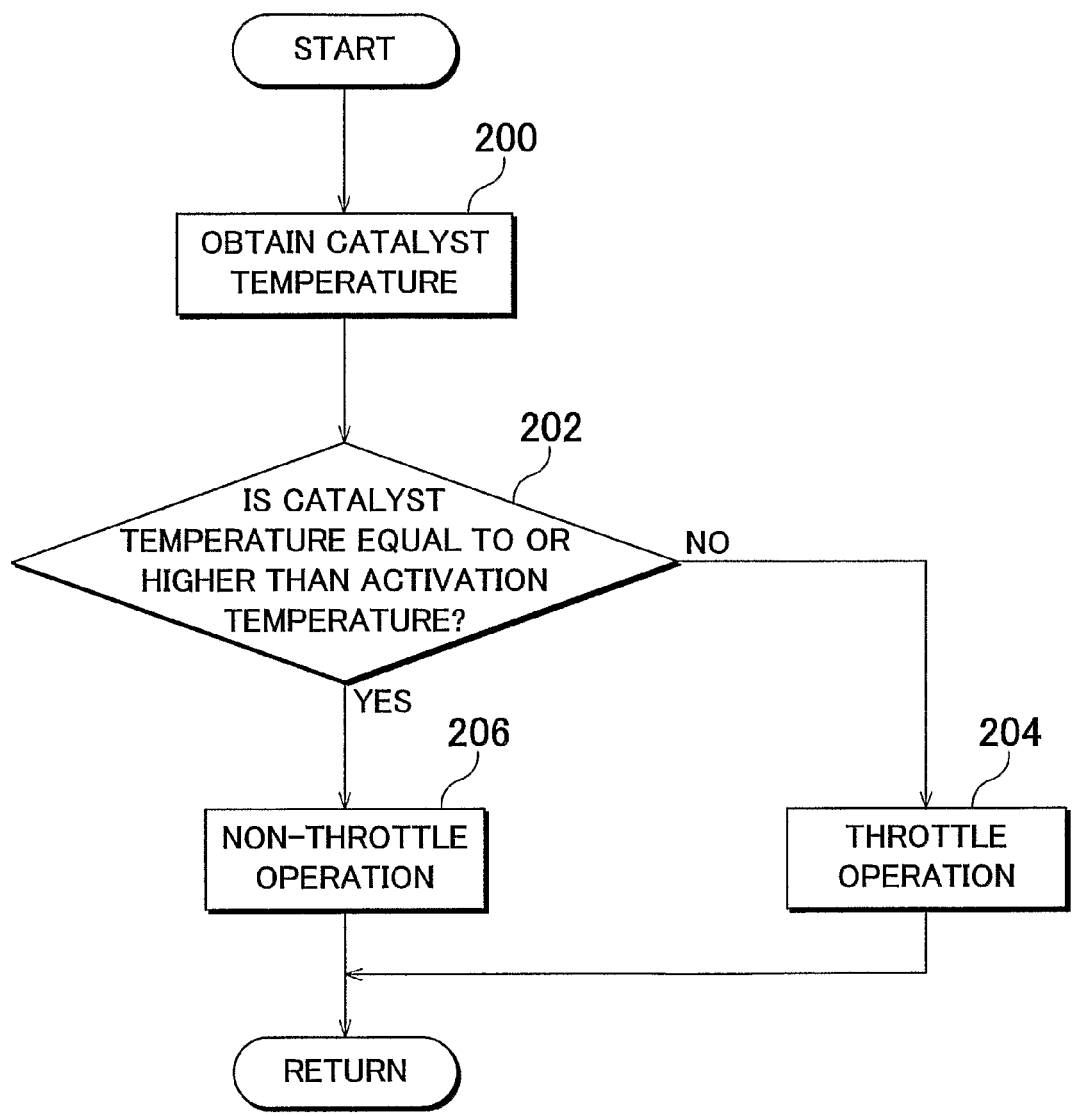
FIG. 5 illustrates the flowchart of the routine performed in the first embodiment of the invention.

Next, the operation in the first embodiment will be described in detail. FIG. 5 is the flowchart of the routine performed by the ECU 60 in the first embodiment to realize the function described above. The routine is periodically performed at predetermined time intervals after the internal combustion engine 6 is started. After the internal combustion engine 6 is started, the throttle operation is performed according to another routine.

In the routine shown in FIG. 5, the temperature of the catalyst 42 is obtained based on the output from the temperature sensor 44 (step 200). Then, it is determined whether the temperature obtained is equal to or higher than the activation temperature (step 202). If it is determined that the temperature of the catalyst 42 has not reached the activation temperature, the throttle operation continues (step 204).

On the other hand, if it is determined in step 202 that the temperature of the catalyst 42 is equal to or higher than the activation temperature, the non-throttle operation is performed instead of the throttle operation (step 206).

With the routine described above, because the throttle operation is performed when the temperature of the catalyst 42 has not reached the activation temperature, a sufficient amount of exhaust gas flows to the catalyst 42. Accordingly, the temperature of the catalyst 42 can be promptly increased to the activation temperature, resulting in reduction in the exhaust emissions. Also, the operation for controlling the amount of air taken in the cylinder is switched to the highly efficient non-throttle operation immediately after the temperature of the catalyst 42 reaches the activation temperature. Therefore, the fuel efficiency is improved.

When the atmospheric temperature is extremely low or the engine idles for an extended period of time, the temperature of the catalyst 42, which is once sufficiently increased, may fall below the activation temperature again. Even in such a case, the fact that the temperature of the catalyst 42 has fallen below the activation temperature is detected in step 202, because the routine shown in FIG. 5 is periodically performed. Then, the throttle operation is performed again in step 204. Accordingly, the temperature of the catalyst 42 can be promptly increased to the activation temperature again.

In the first embodiment described above, the throttle valve 36 is kept fully open during the non-throttle operation. However, it is not necessary to keep the throttle valve 36 fully open during the non-throttle operation. The opening amount of the throttle valve 36 may be a predetermined value that is slightly less than the fully open amount. In the first embodiment described above, the amount of air taken in the cylinder is controlled only by changing the valve-open duration and the valve lift amount of the intake valve 12 during the non-throttle operation. However, the amount of air taken in the cylinder may be controlled by combination of regulation of the opening amount of the throttle valve 36 and changes in the valve-open duration and the valve lift amount of the intake valve 12. For example, the relationship between regulation of the opening amount of the throttle valve 36 and changes in the valve-open duration and the valve lift amount (valve open area) may be as follows; the opening amount of the throttle valve 36 may be changed in synchronization with the variable operation performed by the variable valve system 56 such that the amount of air flowing through the intake passage 30 is a value within the range in which the amount of air taken in the cylinder can be controlled by the intake valve 12. In other words, the non-throttle operation in the invention is not limited to a certain operation as long as the amount of air taken in the cylinder is controlled mainly by the variable operation performed by the variable valve system 56. For example, the amount of air taken in the cylinder may be controlled in combination of regulation of the opening of the throttle valve 36 and the variable operation performed by the variable valve system 56. A second embodiment described below also has this feature.

In the first embodiment described above, the temperature of the catalyst 42 is obtained by actually measuring it using the temperature sensor 44. However, the temperature of the catalyst 42 may be obtained using other methods as well. The value correlated with the temperature of the catalyst 42, for example, the intake air amount integrated value or the fuel injection amount integrated value (energy input amount) after the internal combustion engine 6 is started may obtained, and the temperature of the catalyst 42 may be estimated based on the value obtained. The second embodiment described below also has this feature.

The reference value used in step 202 may be a value close to the activation temperature of the catalyst 42 instead of the exact activation temperature of the catalyst 42.

In the first embodiment described above, the control for promoting warming-up of the catalyst 42 may be performed, for example, the ignition timing may be retarded to increase the temperature of the exhaust gas.

In the first embodiment described above, the temperature sensor 44 may be regarded as the "temperature detection portion" in each of the first and seventh aspects of the invention. Also, the "switching time determination portion", the "throttle operation portion" and the "non-throttle operation portion" in each of the first and seventh aspects of the invention are realized when the ECU 60 performs step 202, step 204 and step 206, respectively.

Hereafter, the opening/closing time control for the intake valve 12 in the first embodiment will be described with reference to FIG. 4. The views on the upper side of FIG. 4 show the opening/closing time of the intake valve 12. As shown in the view on the upper left side of FIG. 4, during the period from when the internal combustion engine 6 is started until when the catalyst 42 is activated, the intake valve 12 is opened after the piston reaches the top-dead-center ("TDC" in FIG. 4). Thus, valve overlap is avoided, and hydrocarbon (HC) is prevented from flowing into the exhaust port 20. Also, the intake valve 12 is closed substantially simultaneously with the piston's reaching the bottom-dead-center ("BDC" in FIG. 4). Thus, the compression stroke can be sufficiently long. Accordingly, the temperature in the cylinder at the end time of the compression stroke can be made high, thereby improving the startability.

As shown in the view on the upper middle of FIG. 4, during the period from when the catalysts 42 is activated until when the internal combustion engine 6 is completely warmed, because the VVT mechanism 50 has not been operated yet, the valve opening time of the intake valve 12 is the same as described above, namely, the intake valve 12 is opened after the piston reaches the top-dead-center. In contrast, the closing time of the intake valve 12 is changed due to the operation of the variable valve mechanism 56. The non-throttle operation is performed by changing the closing time of the intake valve 12.

As shown in the view on the upper right side of FIG. 4, after the internal combustion engine 6 is completely warmed, the non-throttle operation continues and the VVT-mechanism 50, which has not been operated, can be started. If the opening time of the intake valve 12 is advanced by the operation of the VVT mechanism 50, the valve overlap duration can be increased, and the internal EGR (Exhaust Gas Re-circulation) can be performed. When the valve closing time of the intake valve 12 is retarded by the operation of the VVT mechanism 50, the air can be taken in the cylinder by inertial effect, and the volumetric efficiency improves in the high engine speed region.

Figure 6:
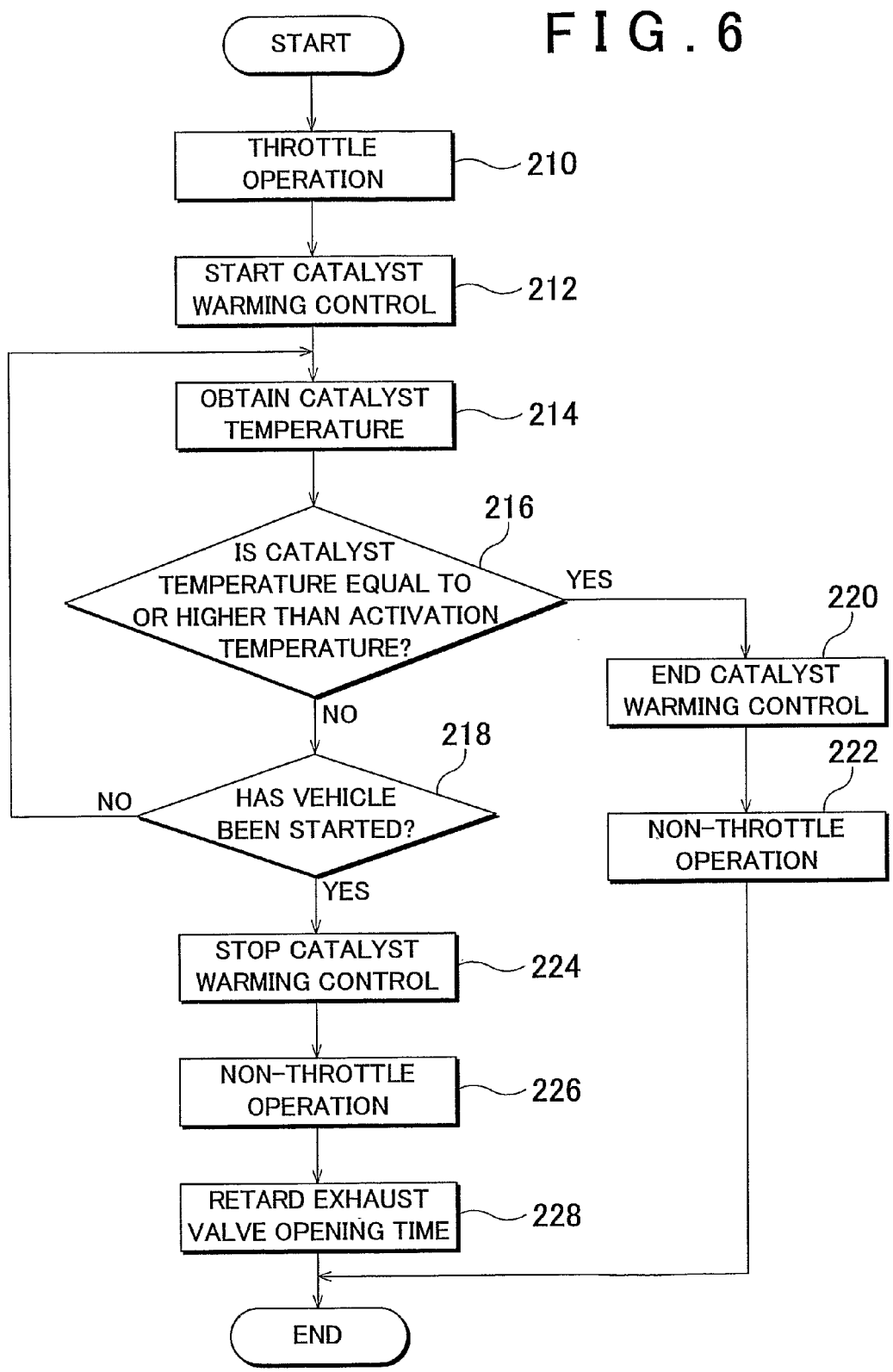
FIG. 6 illustrates the flowchart of the routine performed in a second embodiment of the invention.

Next, the second embodiment of the invention will be described with reference to FIG. 6. Only the features specific to the second embodiment will be described below. The hardware configuration of a system according to the second embodiment is as shown in FIGS. 1 and 2. In the system according to the second embodiment, the routine shown in FIG. 6 is performed.

The features specific to the second embodiment will be described. In the second embodiment, after the internal combustion engine 6 is started, the throttle operation is performed and the catalyst warming control is also performed. In the catalyst warming control, the ignition timing is retarded. Thus, the temperature of the exhaust gas increases. As a result, the catalyst 42 can be quickly warmed.

When the catalyst warming control ends, the operation for controlling the amount of air taken in the cylinder is switched to the non-throttle operation. Thus, the fuel efficiency can be improved without decreasing the efficiency of the catalyst warming control.

If the ignition timing is retarded, the torque fluctuation range is likely to expand. Therefore, if the vehicle starts running while the catalyst warming control is performed, the driver is likely to feel rough operational feeling. In the second embodiment, if it is determined that the vehicle has started running or will start running, the catalyst warming control is stopped in order to prevent such rough operational feeling.

When the catalyst warming control by retarding the ignition timing is stopped, the catalyst warming control is performed in a method other than retardation of the ignition timing is performed. More specifically, control for retarding the opening time of the exhaust valve 14 to a time after the piston reaches the bottom-dead-center is performed.

Next, the operation in the second embodiment will be described in detail. FIG. 6 illustrates the flowchart of the routine performed by the ECU 60 in the second embodiment to realize the function described above. The routine is performed once after the internal combustion engine 6 is started. According to the routine, after the internal combustion engine 6 is started, the throttle operation is performed (step 210). Next, the catalyst warming control is started (step 212). In the catalyst warming control, the ignition timing is retarded.

Next, the temperature of the catalyst 42 is obtained based on the output from the temperature sensor 44 (step 214). Then, it is determined whether the temperature obtained is equal to or higher than the activation temperature (step 216). If it is determined that the temperature of the catalyst 42 has not reached the activation temperature, it is then determined whether the vehicle has started running or will start running (step 218).

In step 218, it is determined whether the vehicle has started running or will start running, for example, by the following known method. Whether the vehicle has started running can be determined based on the output from a vehicle speed sensor. Also, it is determined that the vehicle will start running, when a sensor detects depression of a clutch pedal or the operation of a shift lever, in the case of a vehicle with a manual transmission. In the case of a vehicle with an automatic transmission, it is determined that the vehicle will start running, when a sensor detects the operation for moving a shift lever to the drive range.

If a negative determination is made in step 218 (i.e., the vehicle has not started running and the vehicle will not start running), step 214 is performed again, whereby the catalyst warming control continues. While the catalyst warming control is performed, if it is determined in step 216 that the temperature of the catalyst 42 reaches the activation temperature, the catalyst warming control ends, and the operation for controlling the amount of air taken in the cylinder is switched to the non-throttle operation (step 222). Switching the operation for controlling the amount of air taken in the cylinder to the non-throttle operation immediately after the catalyst warming control ends makes it possible to both reduce the exhaust emissions due to quick activation of the catalyst 42 and improve fuel efficiency.

On the other hand, if it is determined in step 218 that the vehicle has started running or will start running, the catalyst warming control is stopped and the ignition timing is returned to the normal ignition timing (step 224). Thus, torque fluctuation when the vehicle starts running is suppressed, and rough operational feeling can be prevented.

If it is determined in step 218 that the vehicle has started running or will start running, the operation for controlling the amount of air taken in the cylinder is switched to the non-throttle operation (step 226). With this switching operation, the highly efficient non-throttle operation can be continuously performed during the period after the vehicle starts running, in which a greater amount of fuel is required than that during idling time. As a result, the fuel efficiency can be further improved.

If it is determined that the vehicle has started running or will start running, during the catalyst warming control, the opening time of the exhaust valve 14 is retarded instead of retarding the ignition timing (step 228). More specifically, the VVT mechanism 52 provided on the exhaust side is operated, and the phase at which the exhaust valve 14 is opened is retarded such that the exhaust valve 14 is opened after the piston reaches the bottom-dead-center. With this operation, the exhaust valve 14 is kept closed in the first half period of the exhaust stroke. During this first half period, the burned gas in the cylinder is compressed, and then discharged to the exhaust passage 40. Therefore, the temperature of the exhaust gas increases. Accordingly, the catalyst 42, of which the temperature has not reached the activation temperature due to stop of the catalyst warming control, can be quickly warmed.

In the catalyst warming control in step 228, the opening time of the exhaust valve 14 may be retarded instead of retarding the ignition timing. Alternatively, another operation may be performed in the catalyst warming control in step 228, for example, the fuel injection amount may be increased.

In the second embodiment described above, the "throttle operation portion" in each of the second and eighth aspects of the invention is realized when the ECU 60 performs step 210. Also, the "non-throttle operation portion" in each of the second and eighth aspects of the invention is realized when the ECU 60 performs step 222 or step 226. The "catalyst warming portion" in each of the second and eighth aspects of the invention is achieved when the ECU 60 performs step 212. In addition, the "switching portion" in each of the second and eighth aspects of the invention is realized when the ECU 60 performs step 220 or step 222.

In the second embodiment described above, the "vehicle-running-start determination portion", the "stop portion" and the "second catalyst warming portion" in the third aspect are realized when the ECU 60 performs step 218, step 224 and step 228, respectively.

The invention is not limited to the embodiments described above.

The invention claimed is:

1. A control method for an internal combustion engine, comprising:
performing a throttle operation for controlling an amount of air taken in a cylinder by regulating an opening amount of a throttle valve, the throttle valve being provided in an intake passage of the internal combustion engine;
performing a non-throttle operation for controlling the amount of air taken in the cylinder by holding the opening amount of the throttle valve to a predetermined amount and by operating a variable valve system, the variable valve system changing at least one of a valve-open duration and a valve lift amount of an intake valve of the internal combustion engine;
detecting or estimating a temperature of a catalyst, the catalyst being provided in an exhaust passage of the internal combustion engine; and
prohibiting the non-throttle operation when the temperature of the catalyst is below a predetermined value so that the throttle operation warms the catalyst, and permitting the non-throttle operation when the temperature of the catalyst is equal to or higher than the predetermined value.

2. A control method for an internal combustion engine, comprising:
performing a throttle operation for controlling an amount of air taken in a cylinder by regulating an opening amount of a throttle valve, the throttle valve being provided in an intake passage of the internal combustion engine;
performing a non-throttle operation for controlling the amount of air taken in the cylinder by holding the opening amount of the throttle valve to a predetermined amount and by operating a variable valve system, the variable valve system changing at least one of a valve-open duration and a valve lift amount of an intake valve of the internal combustion engine;
performing a catalyst warming control during the throttle operation, when a catalyst needs to be warmed, the catalyst being provided in an exhaust passage of the internal combustion engine; and
switching an operation for controlling the amount of air taken in the cylinder from the throttle operation to the non-throttle operation, when the catalyst warming control ends.

3. The control method for an internal combustion engine according to claim 2, further comprising:
determining whether a vehicle including the internal combustion engine has started running or will start running;
stopping the first catalyst warming control, if it is determined, during the first catalyst warming control, that the vehicle has started running or will start running; and
switching, when the first catalyst warming control is stopped, the operation for controlling the amount of air taken in the cylinder from the throttle operation to the non-throttle operation, and performing a second catalyst warming control that is different from the first catalyst warming control.

4. A control apparatus for an internal combustion engine, comprising:
a throttle valve provided in an intake passage of the internal combustion engine;
a variable valve system that changes at least one of a valve-open duration and a valve lift amount of an intake valve of the internal combustion engine;
a throttle operation portion that performs a throttle operation for controlling an amount of air taken in a cylinder by regulating an opening amount of the throttle valve;
a non-throttle operation portion that performs a non-throttle operation for controlling the amount of air taken in the cylinder by holding the opening amount of the throttle valve to a predetermined amount and by operating the variable valve system;

a catalyst provided in an exhaust passage of the internal combustion engine;

a temperature detection portion that detects or estimates a temperature of the catalyst; and a switching time determination portion that prohibits the non-throttle operation when the temperature of the catalyst is below a predetermined value so that the throttle operation portion warms the catalyst, and that permits the non-throttle operation when the temperature of the catalyst is equal to or higher than the predetermined value.

5. A control apparatus for an internal combustion engine, comprising:

a throttle valve provided in an intake passage of the internal combustion engine;

a variable valve system that changes at least one of a valve-open duration and a valve lift amount of an intake valve of the internal combustion engine;

a throttle operation portion that performs a throttle operation for controlling an amount of air taken in a cylinder by regulating an opening amount of the throttle valve;

a non-throttle operation portion that performs a non-throttle operation for controlling the amount of air taken in the cylinder by holding the opening amount of the throttle valve to a predetermined amount and by operating the variable valve system;

a catalyst provided in an exhaust passage of the internal combustion engine;

a first catalyst warming portion that performs a first catalyst warming control during the throttle operation, when the catalyst needs to be warmed; and a switching portion that switches an operation for controlling the amount of air taken in the cylinder from the throttle operation to the non-throttle operation, when the first catalyst warming control ends.

6. The control apparatus for an internal combustion engine according to claim 5, further comprising:

a vehicle-running-start determination portion that determines whether a vehicle including the internal combustion engine has started running or will start running;

a stop portion that stops the first catalyst warming control, if it is determined, during the first catalyst warming control, that the vehicle has started running or will start running; and a second catalyst warming portion that switches, when the first catalyst warming control is stopped, the operation for controlling the amount of air taken in the cylinder from the throttle operation to the non-throttle operation, and that performs a second catalyst warming control that is different from the first catalyst warming control.

7. The control method for an internal combustion engine according to claim 1, wherein the predetermined amount of the throttle valve is fully open.

8. The control method for an internal combustion engine according to claim 1, wherein the predetermined value of the catalyst temperature is 200° C.

9. The control apparatus for an internal combustion engine according to claim 4, wherein the predetermined amount of the throttle valve is fully open.

10. The control apparatus for an internal combustion engine according to claim 4, wherein the predetermined value of the catalyst temperature is 200° C.

11. The control method for an internal combustion engine according to claim 2, wherein the catalyst warming control includes retarding an ignition timing.

12. The control apparatus for an internal combustion engine according to claim 5, wherein the catalyst warming control includes retarding an ignition timing.

* * * * *